(12) United States Patent
Klein et al.

(10) Patent No.: US 12,585,430 B2
(45) Date of Patent: Mar. 24, 2026

(54) FLOATING-POINT CONVERSION WITH DENORMALIZATION

(71) Applicant: INTERNATIONAL BUSINESS MACHINES CORPORATION, Armonk, NY (US)

(72) Inventors: Michael Klein, Schoenaich (DE); Petra Leber, Ehningen (DE); Cedric Lichtenau, Stuttgart (DE); Stefan Payer, Stuttgart (DE); Kerstin Claudia Schelm, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 17/696,448

(22) Filed: Mar. 16, 2022

(65) Prior Publication Data

US 2023/0297334 A1 Sep. 21, 2023

(51) Int. Cl.
*G06F 7/483* (2006.01)

(52) U.S. Cl.
CPC .................................... *G06F 7/483* (2013.01)

(58) Field of Classification Search
CPC ....................................................... G06F 7/483
See application file for complete search history.

(56) References Cited

U.S. PATENT DOCUMENTS 6,131,106 A * 10/2000 Steele, Jr. ............... G06F 7/483
708/510
6,289,365 B1 * 9/2001 Steele, Jr. ............... G06F 7/483
708/204

| 2002/0184282 A1 | 12/2002 | Yuval et al. |
| 2016/0092168 A1 | 3/2016 | Lutz |
| 2019/0250886 A1 | 8/2019 | Langhammer |

(Continued)

FOREIGN PATENT DOCUMENTS

WO 2023/174833 A1 9/2023

OTHER PUBLICATIONS

Burgess Neil et al., "Bfloat16 Processing for Neural Networks", Proceedings of the 2019 IEEE 26th Symposium on Computer Arithmetic (ARITH), Jun. 10-12, 2019, Kyoto, Japan, 4 pages.

(Continued)

*Primary Examiner* — Michael D. Yaary
(74) *Attorney, Agent, or Firm* — Jeffrey M. Ingalls

(57) ABSTRACT

A method, computer program, and computer system are provided for floating-point conversion with denormalization in a single clock cycle. An input floating-point number corresponding to an input data type is received. An exponent value and a fraction value are extracted from the received input floating-point number. A biasing constant associated with converting the received input floating-point number from the input data type to an output data type is determined. The exponent value is biased based on the biasing constant. The fraction value is converted to the output data type based on a denormalization constant associated with the extracted exponent value and the determined biasing constant. Biasing the exponent value and converting the fraction value occurs in a single clock cycle based on performing these actions in parallel. A floating-point number is output in the output data type corresponding to the converted fraction value and the biased exponent value.

20 Claims, 4 Drawing Sheets

(56) References Cited

U.S. PATENT DOCUMENTS

2020/0201602 A1     6/2020   Felix
2021/0124580 A1     4/2021   Heinecke

OTHER PUBLICATIONS

International Searching Authority, "Notification of Transmittal of the International Search Report and the Written Opinion of the International Searching Authority, or the Declaration", International application No. PCT/EP2023/056273, International filing date Mar. 13, 2023, Date of mailing Jun. 7, 2023, 11 pages.

* cited by examiner

Data Storage
Device 106

Processor
104

Software
Program
108

Computer 102

Communication Network
110

Database
112

Floating-Point
Conversion
Program
116

Server Computer 114

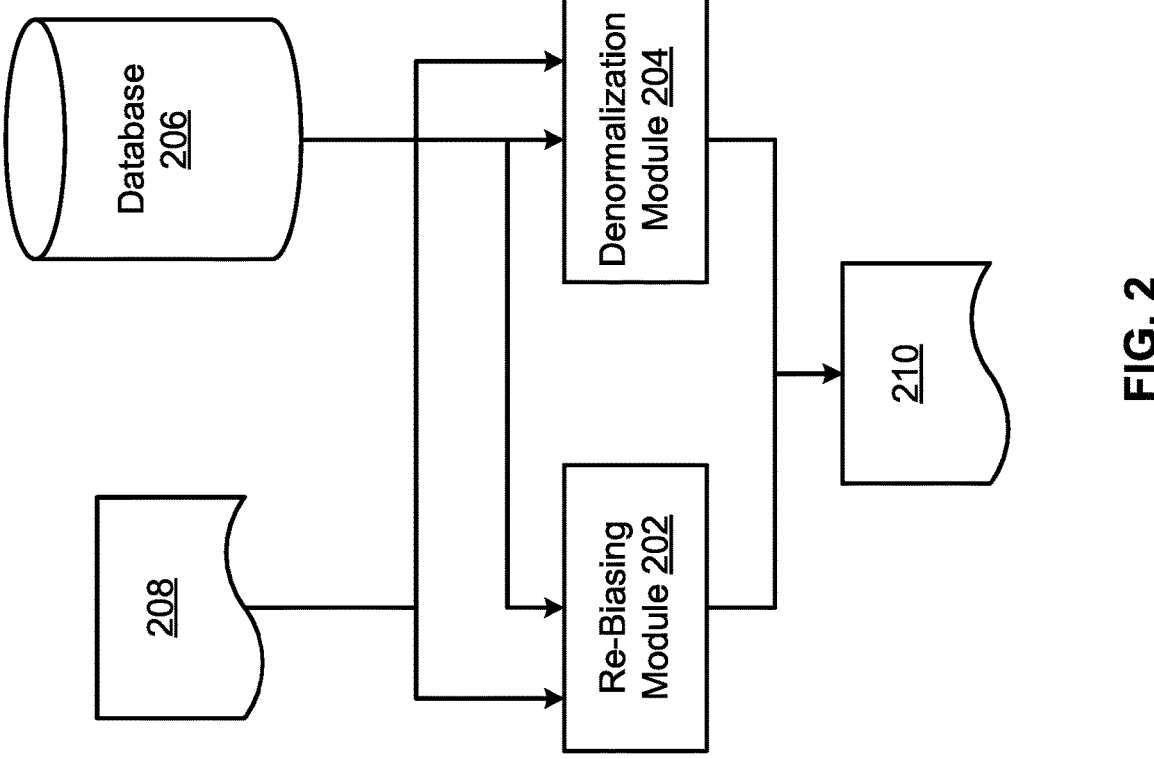
FIG. 2

300

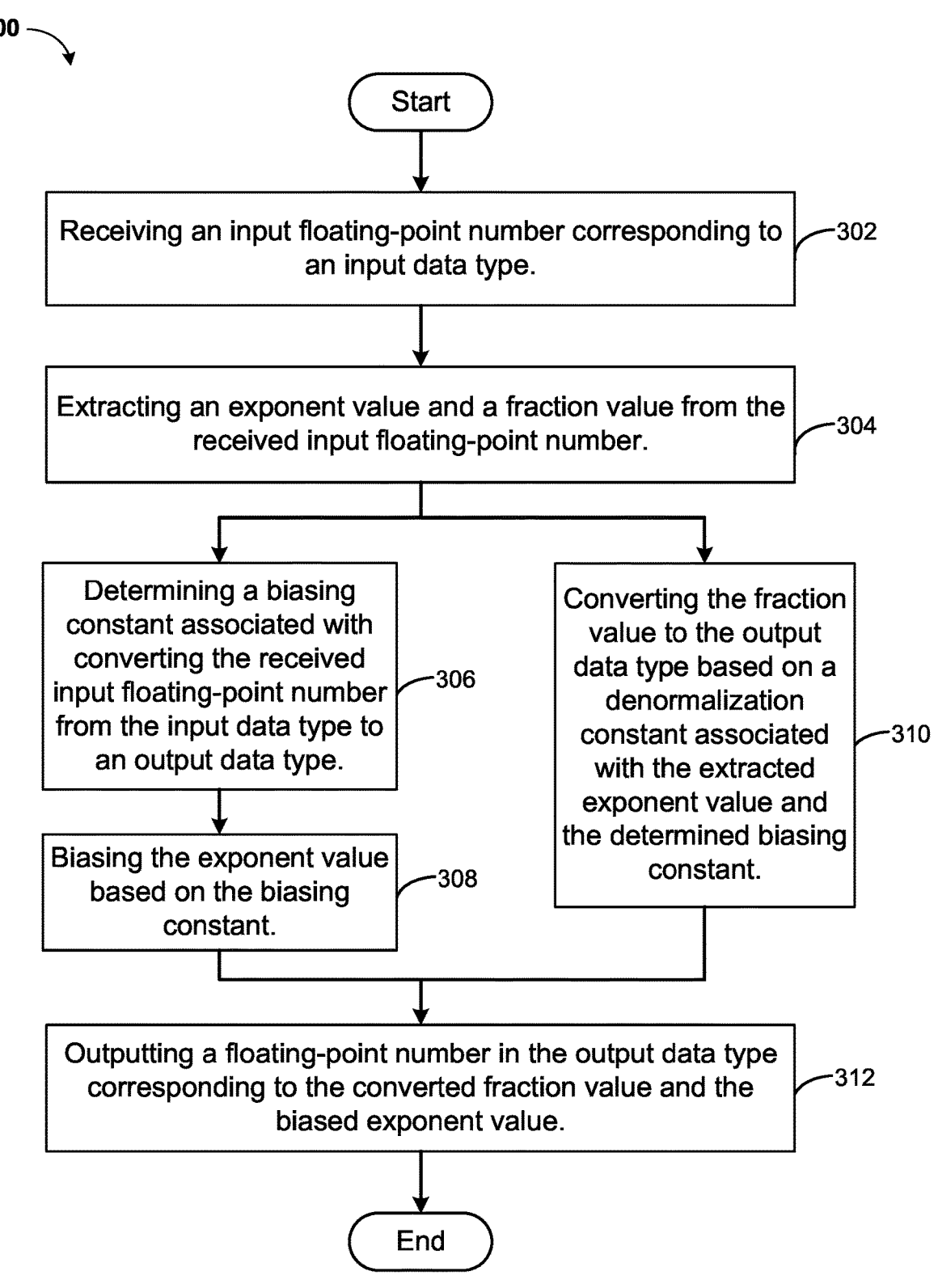

Start

Receiving an input floating-point number corresponding to an input data type. ⟋302

Extracting an exponent value and a fraction value from the received input floating-point number. ⟋304

Determining a biasing constant associated with converting the received input floating-point number from the input data type to an output data type. ⟋306

Biasing the exponent value based on the biasing constant. ⟋308

Converting the fraction value to the output data type based on a denormalization constant associated with the extracted exponent value and the determined biasing constant. ⟋310

Outputting a floating-point number in the output data type corresponding to the converted fraction value and the biased exponent value. ⟋312

End

FIG. 3

FLOATING-POINT CONVERSION WITH DENORMALIZATION

FIELD

This disclosure relates generally to field of computer memory, and more particularly to conversion of floating-point numbers in computer memory.

BACKGROUND

In computing, half precision (sometimes called FP16) is a binary floating-point computer number format that occupies sixteen bits (i.e., two bytes) in computer memory. It is intended for storage of floating-point values in applications where higher precision is not essential, in particular computer graphics images and neural networks. Almost all modern uses follow the IEEE 754-2008 standard, where the 16-bit base-2 format is referred to as binary16, and the exponent uses 5 bits. This can express values in the range ±65,504, with the minimum value above 1 being 1+1/1024.

SUMMARY

Embodiments relate to a method, system, and computer readable medium for floating-point conversion with denormalization. According to one aspect, a method for floating-point conversion with denormalization is provided. The method may include receiving an input floating-point number corresponding to an input data type is received. An exponent value and a fraction value are extracted from the received input floating-point number. A biasing constant associated with converting the received input floating-point number from the input data type to an output data type is determined. The exponent value is biased based on the biasing constant. The fraction value is converted to the output data type based on a denormalization constant associated with the extracted exponent value and the determined biasing constant. Biasing the exponent value and converting the fraction value occurs in a single clock cycle based on performing these actions in parallel. A floating-point number is output in the output data type corresponding to the converted fraction value and the biased exponent value.

According to another aspect, a computer system for floating-point conversion with denormalization is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving an input floating-point number corresponding to an input data type is received. An exponent value and a fraction value are extracted from the received input floating-point number. A biasing constant associated with converting the received input floating-point number from the input data type to an output data type is determined. The exponent value is biased based on the biasing constant. The fraction value is converted to the output data type based on a denormalization constant associated with the extracted exponent value and the determined biasing constant. Biasing the exponent value and converting the fraction value occurs in a single clock cycle based on performing these actions in parallel. A floating-point number is output in the output data type corresponding to the converted fraction value and the biased exponent value.

According to yet another aspect, a computer readable medium for floating-point conversion with denormalization is provided. The computer readable medium may include one or more computer-readable storage devices and program instructions stored on at least one of the one or more tangible storage devices, the program instructions executable by a processor. The program instructions are executable by a processor for performing a method that may accordingly include receiving an input floating-point number corresponding to an input data type is received. An exponent value and a fraction value are extracted from the received input floating-point number. A biasing constant associated with converting the received input floating-point number from the input data type to an output data type is determined. The exponent value is biased based on the biasing constant. The fraction value is converted to the output data type based on a denormalization constant associated with the extracted exponent value and the determined biasing constant. Biasing the exponent value and converting the fraction value occurs in a single clock cycle based on performing these actions in parallel. A floating-point number is output in the output data type corresponding to the converted fraction value and the biased exponent value.

According to one or more aspects, the denormalization constant is determined from a lookup table based on the extracted exponent value and the biasing constant.

According to one or more aspects, the denormalization occurs based on determining the denormalization constant being within a predetermined range.

According to one or more aspects, converting the fraction value to the output data type includes rounding the fraction value and rounding a denormalized fraction value associated with the denormalization constant and selecting between the rounded fraction value and the denormalized fraction value based on the denormalization constant.

According to one or more aspects, the denormalized fraction value corresponds to the fraction value shifted by a number of bits equal to the denormalization constant.

According to one or more aspects, the input data type includes 1 sign bit, 6 exponent bits, and 9 fraction bits, and the output data type includes 1 sign bit, 5 exponent bits, and 10 fraction bits.

According to one or more aspects, converting the fraction value to the output data type includes rounding the fraction value and rounding a denormalized fraction value associated with the denormalization constant and selecting between the rounded fraction value and the denormalized fraction value based on the denormalization constant.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 2 is a block diagram of a system for floating-point conversion, according to at least one embodiment;

FIG. 3 is an operational flowchart illustrating the steps carried out by a program that converts floating-point numbers with denormalization, according to at least one embodiment;

DETAILED DESCRIPTION

Figure 1:
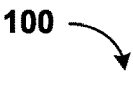
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of computing, and more particularly to data types. The following described exemplary embodiments provide a system, method and computer program to, among other things, convert floating point numbers from one type to another based on determining a denormalization constant from a lookup table. Therefore, some embodiments have the capacity to improve the field of computing by allowing for the conversion between floating point number types within a single clock cycle.

As previously described, half precision (sometimes called FP16) is a binary floating-point computer number format that occupies sixteen bits (i.e., two bytes) in computer memory. It is intended for storage of floating-point values in applications where higher precision is not essential, in particular computer graphics images and neural networks. Almost all modern uses follow the IEEE 754-2008 standard, where the 16-bit base-2 format is referred to as binary16, and the exponent uses 5 bits. This can express values in the range ±65,504, with the minimum value above 1 being 1+1/1024. Specifically, binary16 includes 1 sign bit, 5 exponent bits, and 10 fraction bits.

However, other data types besides binary16 may be used. For example, a specialized artificial intelligence (AI) unit may run on its own 16-bit floating point format (DL-Float/ DLF), with 1 sign bit, 6 exponent bits, and 9 significand bits. Therefore, there exists a strong need for highly efficient conversion hardware from classical floating-point formats, such as binary16 or binary32 to DLF and vice versa. This conversion may take place using biasing and denormalization. For example, binary16 may have a bias of 15 while DLF has a bias of 31, and the exponent may be re-biased by adding or subtracting the difference in bias. However, such a conversion may take longer than one clock cycle to occur without additional hardware. It may be advantageous, therefore, to identify instances in which denormalization is needed or not needed after biasing and performing the denormalization based on a pre-defined lookup table.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that converts floating point numbers from one type to another. Referring now to FIG. 1, a functional block diagram of a networked computer environment illustrating a floating-point conversion system 100 (hereinafter "system") for floating-point conversion with denormalization. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114, which may be used for floating-point conversion with denormalization is enabled to run a Floating-Point Conversion Program 116 (hereinafter "program") that may interact with a database 112. The Floating-Point Conversion Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger floating-point conversion program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

According to one or more embodiments, the network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks. According to one or more embodiments, the network 110 may also be an internal bus of a computer system.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Referring now to FIG. 2, a floating-point conversion system 200 is depicted, according to one or more embodiments. The floating-point conversion system 200 may include, among other things, a re-biasing module 202, a denormalization module 204, and a database 206. The floating point-conversion system 200 may receive input data 208 in a first data type and may output converted data 210 in a second data type.

The re-biasing module 202 may determine biasing constants for an input data type and an output data type. For example, the input data type may include 1 sign bit, 6 exponent bits, and 9 fraction bits, and the output data type may be a half-precision floating-point number including 1 sign bit, 5 exponent bits, and 10 fraction bits. The bias value may be equal to $2^{\wedge}$(number of exponent bits minus 1) so that half of the exponent range is above zero and half is below zero. For example, the bias value may be 15 for 5 exponent bits and 31 for 6 exponent bits. Thus, the re-biasing module 202 may determine a difference in bias constants between the input data type and the output data type. Specifically, the re-biasing module 202 may use a pre-defined lookup table retrieved from the database 206 to determine a denormalization constant based on the value of the exponent bits. The use of a lookup table and denormalization constant may negate the need to calculate the new exponent and fraction values, which allows for the number to be converted to the output data type within a single clock cycle.

The denormalization module 204 may denormalize a biased fraction value based on the denormalization constant. Specifically, the denormalization module 204 may generate a denormalized fraction value that corresponds to the fraction value bit-shifted in memory by a number of bits equal to the denormalization constant. The fraction value and a denormalized fraction value associated may be rounded by the denormalization module 204. The denormalization may only occur based on the denormalization constant being within a predetermined range. For example, if the denormalization constant is large, then the conversion may be out of range. Accordingly, the denormalization module 204 may select between the rounded fraction value and the denormalized fraction value based on the denormalization constant and whether the fraction value is in-range. It may be appreciated that converting the fraction to the output data type occurs in parallel with biasing of the exponent value by the re-biasing module 202. This may allow for the conversion (i.e., converting the fraction value and biasing the exponent value) to occur within a single clock cycle.

Referring now to FIG. 3, an operational flowchart illustrating the steps of a method 300 carried out by a program that converts floating point numbers from one type to another is depicted.

At 302, the method 300 may include receiving an input floating-point number corresponding to an input data type and an output data type. The input data type may include 1 sign bit, 6 exponent bits, and 9 fraction bits, and the output data type may be a half-precision floating-point number including 1 sign bit, 5 exponent bits, and 10 fraction bits. In operation, the re-biasing module 202 (FIG. 2) may receive a floating point number for conversion to the output data type from the database 206 (FIG. 2).

At 304, the method 300 may include extracting an exponent value and a fraction value from the received input floating-point number. The input floating point number may be of a pre-defined data type. In the case of a half-precision floating point number, it may be known that bits two through six correspond to an exponent value while bits seven through sixteen correspond to a fraction value. In operation, the re-biasing module 202 (FIG. 2) may separate the number into its respective exponent and fraction values.

At 306, the method 300 may include determining a biasing constant associated with converting the received input floating-point number from the input data type to an output data type. The biasing constant may be retrieved from a lookup table based on the input and output data types. In operation, the re-biasing module 202 (FIG. 2) may retrieve a biasing constant from the database 206 (FIG. 2) for conversion of the floating-point number.

At 308, the method 300 may include biasing the exponent value based on the biasing constant. Biasing the exponent value may be performed by bit-shifting the exponent value. In operation, the re-biasing module 202 (FIG. 2) may bit-shift the exponent value of the number retrieved from the database 206 (FIG. 2) by a number of bits corresponding to the biasing constant retrieved from the database 206.

At 310, the method 300 may include converting the fraction value to the output data type based on a denormalization constant associated with the extracted exponent value and the determined biasing constant. The conversion of the fraction value may occur in parallel with biasing of the exponent value to allow for the conversion and biasing to take place within a single clock cycle. The fraction value may be converted based on the denormalization constant being within a predetermined range. The conversion may include rounding the fraction value, rounding a denormalized fraction value associated with the denormalization constant, and selecting between the rounded fraction value and the denormalized fraction value based on the denormalization constant. In operation, the denormalization module 204 (FIG. 2) may de-normalize the fraction value of the number by a denormalization constant in a lookup table retrieved from the database 206 (FIG. 2).

At 312, the method 300 may include outputting a floating-point number in the output data type corresponding to the converted fraction value and the biased exponent value. As previously discussed, the output floating-point number may be of a pre-defined output data type. In operation, the re-biasing module 202 (FIG. 2) and the denormalization module 204 (FIG. 2) may respectively output the biased exponent value and the converted fraction value as output converted data 210 (FIG. 2) in the output data type.

It may be appreciated that FIG. 3 provides only an illustration of one implementation and does not imply any limitations with regard to how different embodiments may be implemented. Many modifications to the depicted environments may be made based on design and implementation requirements.

Figure 4:
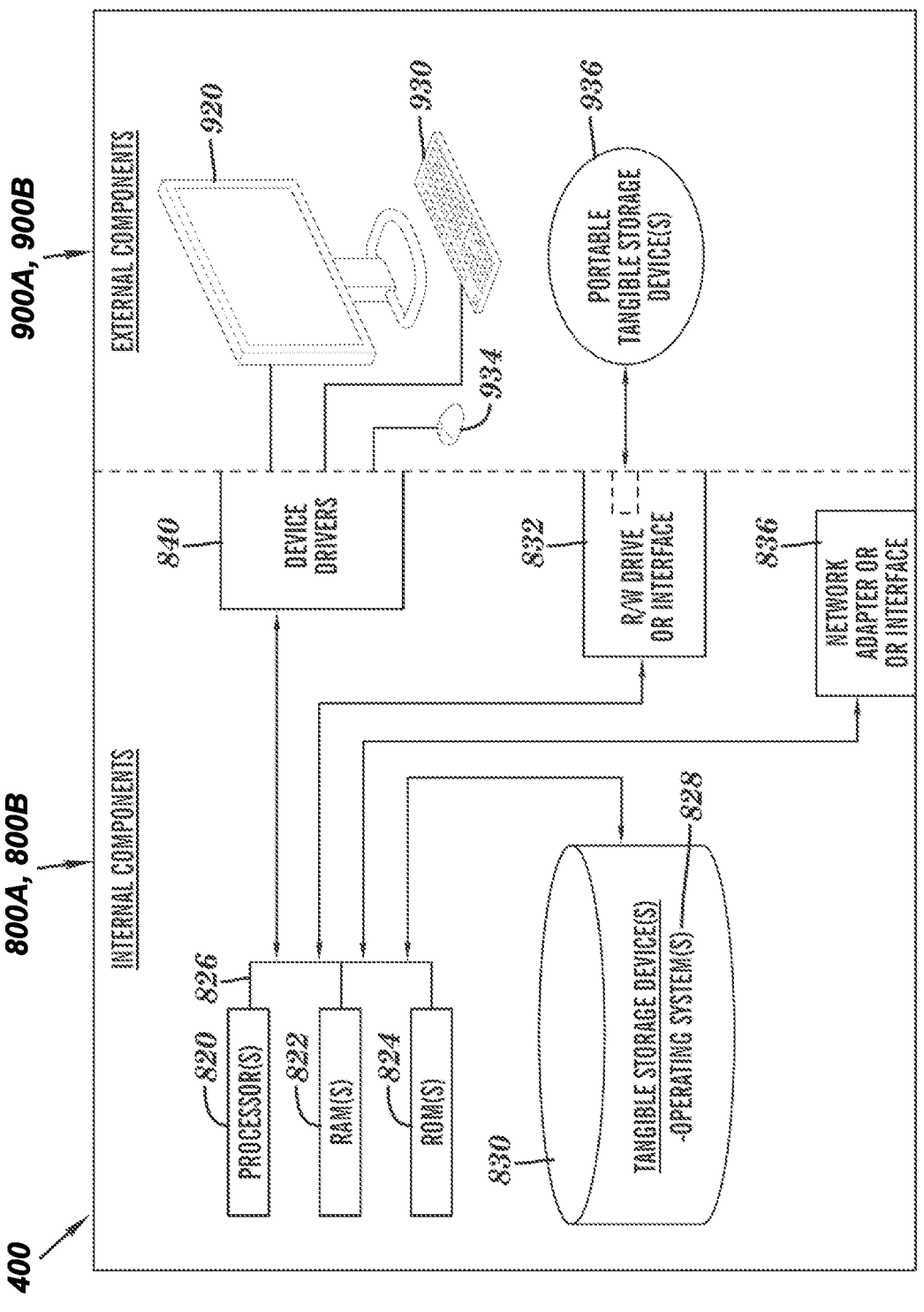
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Floating-Point Conversion Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a magnetic tape, and/or another type of non-transitory computer-readable tangible storage device that can store a computer program and digital information.

Each set of internal components 800A,B also includes a RAY drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Floating-Point Conversion Program 116 (FIG. 1) can be stored on one or more of the respective portable computer-readable tangible storage devices 936, read via the respective RAY drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Floating-Point Conversion Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Floating-Point Conversion Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, RAY drive or interface 832 and network adapter or interface 836 comprise hardware and software (stored in storage device 830 and/or ROM 824).

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of floating-point conversion with denormalization in a single clock-cycle, the method executable by a processor, the method comprising:

receiving an input floating-point number corresponding to an input data type;

extracting an exponent value and a fraction value from the received input floating-point number;

determining a biasing constant associated with converting the received input floating-point number from the input data type to an output data type;

biasing the exponent value based on the biasing constant;

converting the fraction value to the output data type based on a denormalization constant associated with the extracted exponent value and the determined biasing constant, wherein biasing the exponent value and converting the fraction value to the output data type occurs in a single clock cycle based on the converting the fraction value occurring in parallel with biasing the exponent value; and outputting a floating-point number in the output data type corresponding to the converted fraction value and the biased exponent value, wherein the output data type is configured to be used with an artificial intelligence system.

2. The method of claim 1, wherein the denormalization constant is determined from a lookup table based on the extracted exponent value and the biasing constant.

3. The method of claim 1, wherein the denormalization occurs based on determining the denormalization constant being within a predetermined range.

4. The method of claim 1, wherein converting the fraction value to the output data type comprises:

rounding the fraction value and rounding a denormalized fraction value associated with the denormalization constant; and selecting between the rounded fraction value and the denormalized fraction value based on the denormalization constant.

5. The method of claim 4, wherein the denormalized fraction value corresponds to the fraction value shifted by a number of bits equal to the denormalization constant.

6. The method of claim 1, wherein the input data type comprises 1 sign bit, 6 exponent bits, and 9 fraction bits.

7. The method of claim 6, wherein the output data type is a half-precision floating-point number comprising 1 sign bit, 5 exponent bits, and 10 fraction bits.

8. A computer system for floating-point conversion with denormalization in a single clock cycle, the computer system comprising:

one or more computer-readable non-transitory storage media configured to store computer program code; and one or more computer processors configured to access said computer program code and operate as instructed by said computer program code, said computer program code including:

receiving code configured to cause the one or more computer processors to receive an input floating-point number corresponding to an input data type;

extracting code configured to cause the one or more computer processors to extract an exponent value and a fraction value from the received input floating-point number;

determining code configured to cause the one or more computer processors to determine a biasing constant associated with converting the received input floating-point number from the input data type to an output data type;

biasing code configured to cause the one or more computer processors to bias the exponent value based on the biasing constant;

converting code configured to cause the one or more computer processors to convert the fraction value to the output data type based on a denormalization constant associated with the extracted exponent value and the determined biasing constant, wherein biasing the exponent value and converting the fraction value to the output data type occurs in a single clock cycle based on the converting the fraction value occurring in parallel with biasing the exponent value; and outputting code configured to cause the one or more computer processors to output a floating-point number in the output data type corresponding to the converted fraction value and the biased exponent value, wherein the output data type is configured to be used with an artificial intelligence system.

9. The computer system of claim 8, wherein the denormalization constant is determined from a lookup table based on the extracted exponent value and the biasing constant.

10. The computer system of claim 8, wherein the denormalization occurs based on determining the denormalization constant being within a predetermined range.

11. The computer system of claim 8, wherein the converting code comprises:

rounding the fraction value and rounding a denormalized fraction value associated with the denormalization constant; and selecting between the rounded fraction value and the denormalized fraction value based on the denormalization constant.

12. The computer system of claim 11, wherein the denormalized fraction value corresponds to the fraction value shifted by a number of bits equal to the denormalization constant.

13. The computer system of claim 8, wherein the input data type comprises 1 sign bit, 6 exponent bits, and 9 fraction bits.

14. The computer system of claim 13, wherein the output data type is a half-precision floating-point number comprising 1 sign bit, 5 exponent bits, and 10 fraction bits.

15. A non-transitory computer readable medium having stored thereon a computer program for floating-point conversion with denormalization in a single clock cycle, the computer program configured to cause one or more computer processors to:

receive an input floating-point number corresponding to an input data type;

extract an exponent value and a fraction value from the received input floating-point number;

determine a biasing constant associated with converting the received input floating-point number from the input data type to an output data type;

bias the exponent value based on the biasing constant;

convert the fraction value to the output data type based on a denormalization constant associated with the extracted exponent value and the determined biasing constant, wherein biasing the exponent value and converting the fraction value to the output data type occurs in a single clock cycle based on the converting the fraction value occurring in parallel with biasing the exponent value; and output a floating-point number in the output data type corresponding to the converted fraction value and the biased exponent value, wherein the output data type is configured to be used with an artificial intelligence system.

16. The computer readable medium of claim 15, wherein the denormalization constant is determined from a lookup table based on the extracted exponent value and the biasing constant.

17. The computer readable medium of claim 15, wherein the denormalization occurs based on determining the denormalization constant being within a predetermined range.

18. The computer readable medium of claim 15, wherein the processor is further configured to cause the one or more processors to:

round the fraction value and rounding a denormalized fraction value associated with the denormalization constant; and select between the rounded fraction value and the denormalized fraction value based on the denormalization constant.

19. The computer readable medium of claim 18, wherein the denormalized fraction value corresponds to the fraction value shifted by a number of bits equal to the denormalization constant.

20. The computer readable medium of claim 15, wherein the input data type comprises 1 sign bit, 6 exponent bits, and 9 fraction bits, and wherein the output data type is a half-precision floating-point number comprising 1 sign bit, 5 exponent bits, and 10 fraction bits.

\* \* \* \* \*